United States Patent
Ogawa

Patent Number: 6,151,187
Date of Patent: Nov. 21, 2000

[54] DISK UNIT, A SERVO TRACK WRITE SYSTEM AND A SERVO TRACK WRITE METHOD

[75] Inventor: Yoshinori Ogawa, Kanagawa, Japan

[73] Assignee: Fujitsu Limited, Kawasaki, Japan

[21] Appl. No.: 09/016,873

[22] Filed: Jan. 30, 1998

[30] Foreign Application Priority Data

Aug. 18, 1997 [JP] Japan ................... 9-221278

[51] Int. Cl.$^7$ .................................................. G11B 21/08
[52] U.S. Cl. .......................................................... 360/78.14
[58] Field of Search .................................. 360/75, 77.08, 360/77.02, 77.05, 78.14

[56] References Cited

U.S. PATENT DOCUMENTS

| | | |
|---|---|---|
| 4,703,371 | 10/1987 | Redmond et al. . |
| 5,559,648 | 9/1996 | Hunter et al. . |
| 5,570,247 | 10/1996 | Brown et al. ............................. 360/75 |
| 5,581,420 | 12/1996 | Chainer et al. . |
| 5,761,007 | 6/1998 | Price et al. . |
| 5,926,336 | 7/1999 | Le et al. ..................................... 360/75 |
| 5,949,603 | 9/1999 | Brown et al. ............................. 360/75 |

FOREIGN PATENT DOCUMENTS

| | | |
|---|---|---|
| 715299 | 6/1996 | European Pat. Off. . |
| 721184 | 7/1996 | European Pat. Off. . |
| 54-079014 | 6/1979 | Japan . |
| 58-147802 | 9/1983 | Japan . |
| 59-124069 | 7/1984 | Japan . |
| 61-279963 | 12/1986 | Japan . |
| 61-280016 | 12/1986 | Japan . |
| 62-188015 | 8/1987 | Japan . |
| 62-219030 | 9/1987 | Japan . |
| 62-298061 | 12/1987 | Japan . |
| 2033781 | 2/1990 | Japan . |
| 2121166 | 5/1990 | Japan . |
| 3116481 | 5/1991 | Japan . |
| 3147578 | 6/1991 | Japan . |
| 3203071 | 9/1991 | Japan . |
| 540725 | 2/1993 | Japan . |
| 5089620 | 4/1993 | Japan . |
| 65020 | 1/1994 | Japan . |
| 6124552 | 5/1994 | Japan . |
| 7045014 | 2/1995 | Japan . |
| 7220422 | 8/1995 | Japan . |
| 7254245 | 10/1995 | Japan . |
| 8263953 | 10/1996 | Japan . |
| 2286481 | 8/1995 | United Kingdom . |
| 9411864 | 5/1994 | WIPO . |

*Primary Examiner*—William Klimowicz
*Attorney, Agent, or Firm*—Greer, Burns & Crain, Ltd.

[57] ABSTRACT

Each servo disk is formed by obtaining an angle from a stopper space obtained by moving an actuator, further obtaining a feed pitch angle for each cylinder by a prespecified number of cylinders from the angle, and writing servo data thereon according to the pitch angle, so that a feed pitch angle becomes larger in association with a wider space between the stoppers, with which a larger track pitch for each cylinder can be insured.

8 Claims, 16 Drawing Sheets

SPACE BETWEEN STOPPERS→ $\theta 4$ (DEGREE)
FEED PITCH ANGLES→P (DEGREE)
NUMBER OF CYLINDERS→N4 (PIECE)

SPACE BETWEEN STOPPERS→ $\theta 5$ (DEGREE)
FEED PITCH ANGLES→P (DEGREE)
NUMBER OF CYLINDERS→N5 (PIECE)  (N4<N5)

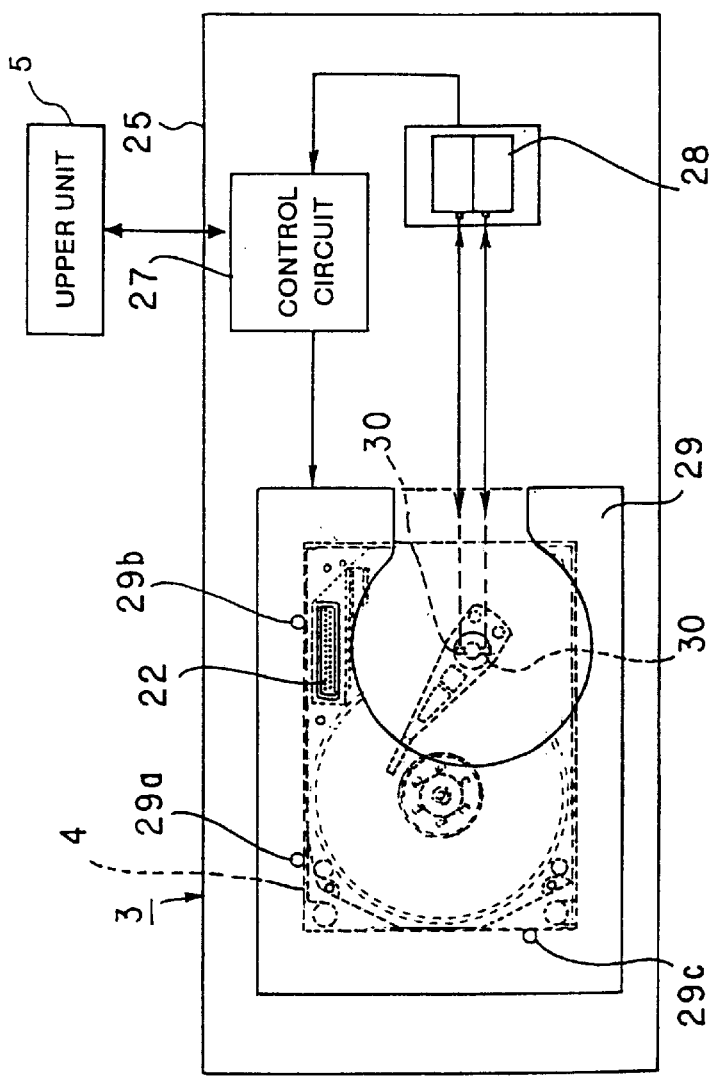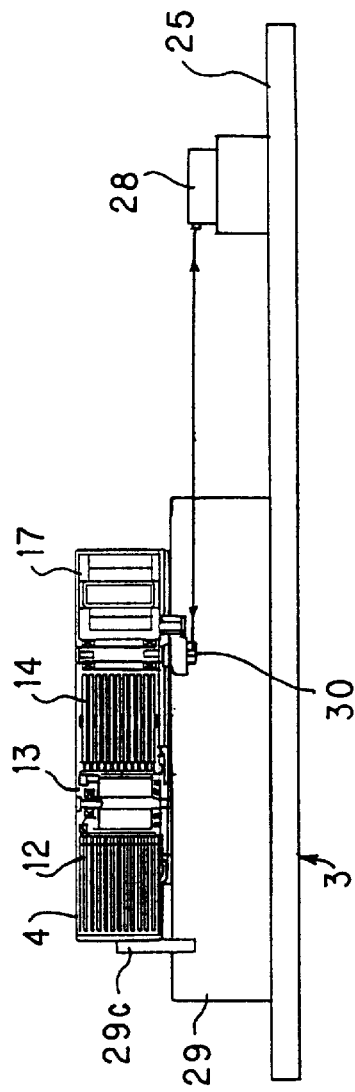
FIG.13A
FIG.13B

DISK UNIT, A SERVO TRACK WRITE SYSTEM AND A SERVO TRACK WRITE METHOD

FIELD OF THE INVENTION

The present invention relates to a disk unit for reading out servo data from a disk, positioning a head by actuating an actuator, and executing read/write of data from/in the disk, and to a servo track write system as well as a servo track write method. In recent years, minimization, higher performance and cost reduction of a disk unit as an external storage for a computer have been required. Therefore, in order to realize cost reduction, it is important to improve quality of products as well as to enhance yield of the products.

BACKGROUND OF THE INVENTION

FIG. 14 is a cross-sectional view schematically showing configuration of a conventional type of disk unit which is mounted on a servo track writer. In FIG. 14, designated at the reference numeral 41 is a base, at 42 a disk, at 43 a spindle motor, at 44 a head actuator mounting the head thereon, at 45 a voice coil motor, at 51 a stage, at 52 a clock head, at 53 an actuator for a pin pick, and at 54 a pin pick. It should be noted that a magnetic disk is used for the disk 42 as one example herein.

As shown in FIG. 14, when a disk unit is a type having a base cover, for example, almost all components of the disk unit excluding a cover (not shown) and a printed board (not shown) are assembled on the base 41, and the assembled components are fixed to the stage 51 of the servo track writer.

With those steps, the clock head 52 dedicated to writing/reading of a reference clock is loaded on one face of the disk 42 (e.g. on the top surface of the uppermost disk as shown in the figure), and on the other hand the actuator 53 for a pip pick for the servo track writer, which is a different body from the head actuator 44 for the disk unit itself, presses down a movable section of the head actuator 44 for the disk unit itself via the pin pick 54. For this reason, operations for positioning and moving the movable section of the head actuator 44 are executed for each track, and an operation for writing data in a servo track on a disk is executed according to the operations.

Recently, some disk units do not employ a self-servo data write system for writing servo data with a combination of a disk laminated body and a head, but employ an embedded servo system for writing servo data in the state of spindle assembly where the disks are laminated on the spindle using the head dedicated to writing data in a servo track on a disk and the head actuator.

In the conventional type of system, however, when it is required to write servo data in the entire data face like in the embedded servo system, if displacement of the head is large, displacement occurs in the radial direction of the disk as well as in the direction of perimeter thereof, which may lower performance as a disk unit. Therefore, under the current tendency for minimization of disk units, as shown in FIG. 14, it is desirable to write servo data in a state where combination of the spindle motor 43 with the head actuator 44 is maintained.

In the conventional type of servo track write system, an operation for writing data in a servo track on a disk is executed using a servo head (data head in the embedded servo system) mounted on the disk unit, so that a position of a stopper restricting a movable range of the head actuator for each disk unit may not be uniformed according to differences in dimensional precision of the components or dimensional precision in assembly.

Assuming non-uniformity in a stopper position as described above, generally a track pitch is previously set to a narrow width so that data will be written in all cylinders previously specified even if there is any dimensional non-uniformity within an allowable range of common difference in a stopper position.

Description is made herein for the conventional type of disk with reference to FIG. 15 and FIGS. 16A to 16C. FIG. 15 is a view showing an example of zone layout on a disk, and FIGS. 16A to 16C are views showing an arrangement of servo data on a disk shown in FIG. 15 in the radial direction thereof.

FIG. 15 shows in comparison zone layouts ZL1, ZL2, and ZL3 on three types of disk units each with data written in a servo track thereon and also each assembled with a different stopper space. Comparing the sizes of the zone layouts ZL1, ZL2 and ZL3 to each other by aligning the outer-side stopper positions OSP at the left side edge (in the figure), inner-side stopper positions ISP are away from the outer-side stopper position OSP in the ascending order of ISP2, ISP1, and ISP3. From the difference among the stopper spaces, a relation among the sizes of the zone layouts ZL1, ZL2, and ZL3 is ZL2 (narrowest stopper space)<ZL1 (intermediate stopper space)<ZL3 (widest stopper space).

However, the operation for writing data in a servo track on a disk requires, as already described, a condition in which data is written in all the prespecified number of cylinders on the disk regardless of the stopper space, so that the same number of data tracks are provided on each of the zone layouts ZL1, ZL2, and ZL3 with the same track pitch. Namely, each of the zone layouts ZL1, ZL2 and ZL3 has a data zone DZ with the same size as shown in FIG. 15.

If there occurs any displacement in the stopper space from the outer side edge as a reference, outer guard zones OGZ each having the same size are provided in the outer side of the zone layouts ZL1, ZL2 and ZL3, and also inner guard zones IGZ1, IGZ2 and IGZ3 each having a difference size according to the difference in the stopper space are provided in the inner side. A relation among the sizes is as indicated by the following relational expression: IGZ2<IGZ1<IGZ3.

Practically, the relation among the zone layouts ZL1, ZL2 and ZL3 is as shown in FIG. 16A, FIG. 16B, and FIG. 16C respectively. A spare zone outside the movable range of the actuator in the inner side exists in a space, in the radial direction of the disk, from the circuit up to the inner guard zone. Assuming that the outer side stopper position OSP is fixed, this spare zone and the inner guard zone have a relation in which the inner guard zone is, when the spare zone is widened, in turn narrower.

Namely, to make description simple, considering each inner guard zone for each zone layout with reference to the spare zone of the zone layout ZL1 as a reference, the zone layout ZL2 has a wider spare zone and has in turn a narrower inner guard zone IGZ2, while the zone layout ZL3 has a narrower spare zone and has in turn a wider inner guard zone IGZ3.

In the servo track write method according to the example based on the conventional technology, a data zone and a track pitch are specified so that all of a prespecified number of cylinders can be obtained on a disk even when a stopper space becomes the narrowest due to nonuniformity of dimensions thereof, and for this reason, even when the stopper space becomes larger as that in the disk shown in FIG. 16C, it only makes an inner guard zone wider, namely it expands an area in which data is not written, which does not give any influence requirement that the operation for writing data in a servo track on a disk is executed in a required narrowest data zone according to a required narrowest possible track pitch.

In recent years, in association with increasing demands for larger capacity of a disk unit, a recording density in a disk unit becomes increasingly higher, and as a result, the technology is approaching limits in memory capacity as well as in capability of securely recording data.

SUMMARY OF THE INVENTION

It is a first object of the present invention to provide, by focusing attention on improvement of a track pitch in order to respond to the expectations as described above, a disk unit which can make effective use of a spare region generated according to a stopper space, and also to provide a servo track write system as well as a servo track write method.

It is a second object of the present invention to provide, by focusing attention on improvement of a data zone in order to respond to the expectations as described above, a disk unit which can make effective use of a spare region generated according to a stopper space, and also to provide a servo track write system as well as a servo track write method.

In order to solve the problems as well as to achieve the objects, a disk unit according to the present invention comprises a head for at least reading data stored in a disk, a head actuator for moving the head in a radial direction of the head, and a pair of stoppers for restricting movement of the head actuator to the inner side as well as to the outer side of the disk and also restricting a maximum movable range of the head, and the disk comprises cylinders each having a track pitch decided by evenly dividing the maximum movable range of the head by a specified number of cylinders.

With the disk unit according to the present invention, a track pitch is obtained as widely as possible within the maximum movable range of the head, so that a TPI margin can be insured more largely than that based on the conventional technology, and with this feature, yield at a testing step is improved and reliability thereof is also improved.

A disk unit according to the present invention comprises a head for at least reading data stored in a disk, a head actuator for moving the head in a radial direction of the head, and a pair of stoppers for restricting movement of the head actuator to the inner side as well as to the outer side of the disk and also restricting a maximum movable range of the head, and the disk comprises the total number of cylinders decided by evenly dividing the maximum movable range of the head by a specified number of track pitches.

As the disk unit according to the present invention, a higher capacity of a disk may be achieved by increasing the total number of cylinders as compared with those based on the conventional technology.

In a servo track write system for a disk unit according to the present invention having a head for at least reading data stored in a disk, a head actuator for moving the head in a radial direction of the head, and a pair of stoppers for restricting movement of the head actuator to the inner side as well as to the outer side of the disk and also restricting a maximum movable range of the head, the servo track write system comprises a recognizing unit for moving the head actuator until it strikes the stoppers in the inner side and in the outer side to recognize a movable range of the head actuator, a computing unit for evenly dividing the movable range recognized by the recognizing unit by a prespecified number of cylinders and obtaining a feed pitch angle for writing servo data in each cylinder obtained through the computing operation above, and a servo data write control unit for controlling an operation for writing servo data in the disk according to the pitch angle obtained by the computing unit.

With the servo track write system according to the present invention, a feed pitch angle becomes larger in association with a wider space between stoppers, with which a larger track pitch for each cylinder is insured, and with this feature, it can be prevented that a track pitch is fixed, and it is possible to make effective use of a spare region generated according to the space between stoppers.

In a servo track write system for a disk unit according to the present invention having a head for at least reading data stored in a disk, a head actuator for moving the head in a radial direction of the head, and a pair of stoppers for restricting movement of the head actuator to the inner side as well as to the outer side of the disk and also restricting a maximum movable range of the head, the servo track write system comprises a recognizing unit for moving the head actuator until it strikes the stoppers in the inner side and in the outer side to recognize a movable range of the head actuator, a computing unit for obtaining the total number of cylinders when fed according to a track pitch previously decided based on the movable range recognized by the recognizing unit, and a servo data write control unit for deciding the number of cylinders in which data is to be written according to the total number of cylinders obtained by the computing unit and controlling an operation for writing servo data in each cylinder according to the decided number of cylinders.

With the servo track write system according to the present invention, the number of cylinders provided on the disk increases as a stopper space becomes larger, which makes it possible to increase the number of cylinders in which servo data can be written, so that such a case never occurs as that in which a data zone is fixed by fixing the number of cylinders in which servo data can be written, and also it is possible to make effective use of a spare region generated according to the stopper space.

In a servo track write method for a disk unit according to the present invention having a head for at least reading data stored in a disk, a head actuator for moving the head in a radial direction of the head, and a pair of stoppers for restricting movement of the head actuator to the inner side as well as to the outer side of the disk and also restricting a maximum movable range of the head, the method comprises a first step of moving the head actuator until it strikes the stoppers in the inner side and in the outer side to recognize a movable range of the head actuator, a second step of evenly dividing the movable range recognized in the first step by a prespecified number of cylinders and obtaining a feed pitch angle for writing servo data in each of the cylinders obtained by the above computing operation, and a third step of providing controls over an operation for writing servo data in the disk according to the pitch angle obtained in the second step.

With the servo track write method according to the present invention, a feed pitch angle becomes larger as a stopper space becomes wider, and for this reason a larger track pitch is insured for each cylinder, and with this feature, it is possible to make effective use of a spare region generated according to the space between stoppers without fixing a track pitch.

In a servo track write method for a disk unit according to the present invention having a head for at least reading data stored in a disk, a head actuator for moving the head in a radial direction of the head, and a pair of stoppers for restricting movement of the head actuator to the inner side as well as to the outer side of the disk and also restricting a maximum movable range of the head, the method comprises a first step of moving the head actuator until it strikes the stoppers in the inner side and in the outer side to recognize a movable range of the head actuator, a second step of obtaining the total number of cylinders when fed by a track pitch previously decided according to the movable range recognized in the first step, and a third step of deciding the number of cylinders in which data is to be written according to the total number of cylinders obtained in the second step and providing controls over an operation for writing servo data in each cylinder according to the decided number of cylinders.

With the servo track write method according to the present invention, the number of cylinders provided on the disk increases as a stopper space becomes larger, and also the number of cylinders in which servo data is to be written can be increased, so that it is not required to fix a data zone by setting the number of cylinders in which servo data is to be written to a constant value, and also it is possible to make effective use of a spare region generated according to the stopper space.

Other objects and features of this invention will become understood from the following description with reference to the accompanying drawings.

BRIEF DESCRIPTION OF THE DRAWINGS

FIG. 13A is a top plan view showing a state where the disk unit is mounted on the servo track write system shown in FIG. 12, and FIG. 13B is a side view of the same;

DESCRIPTION OF THE PREFERRED EMBODIMENT

Detailed description is made hereinafter for preferred embodiments of the disk unit, servo track write system and a servo track write method according to the present invention with reference to the related drawings.

Figure 1:
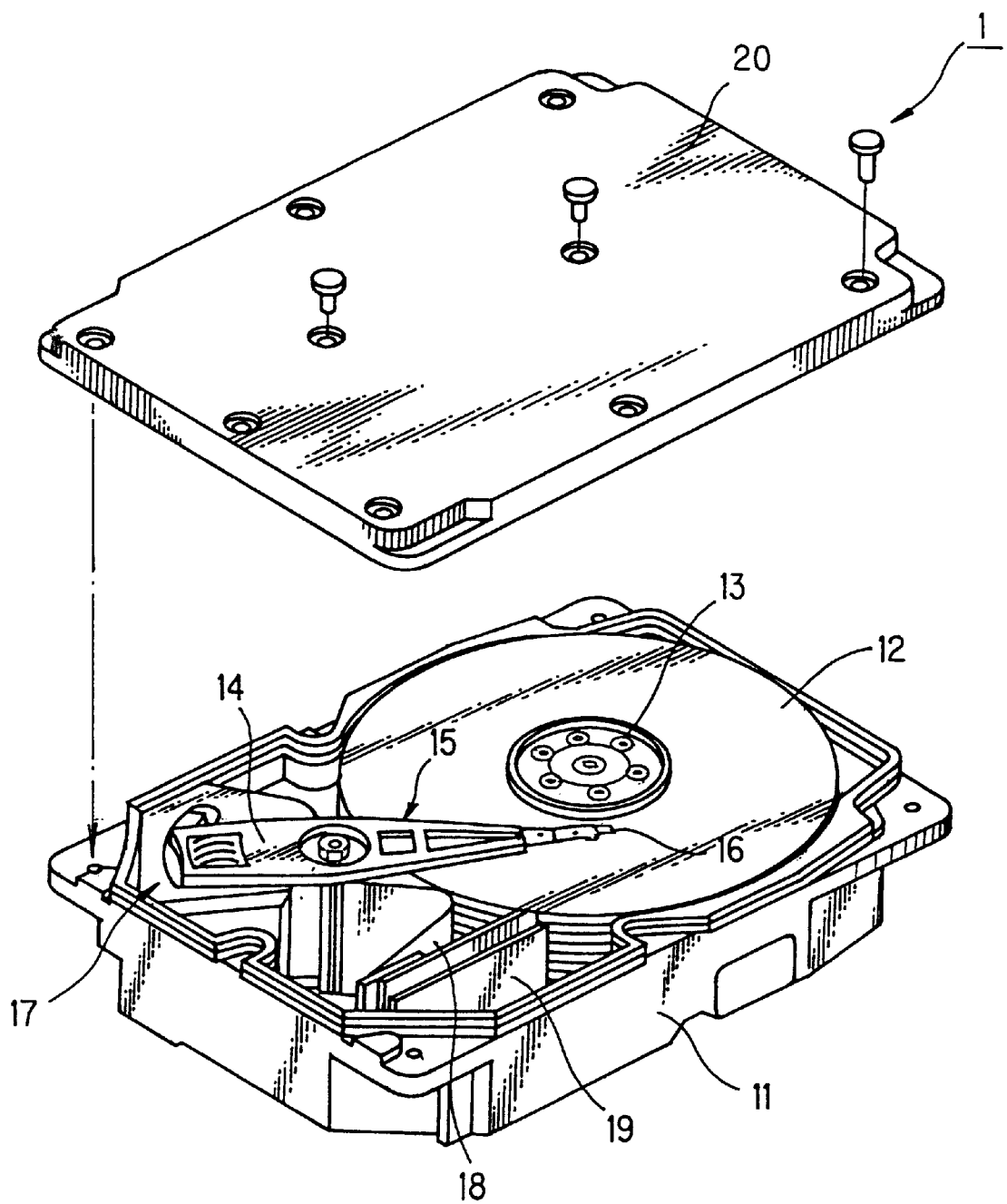
FIG. 1 is an appearance-perspective view of the disk unit according to Embodiment 1 of the present invention with its cover removed therefrom.

At first, description is made for configuration according to Embodiment 1. FIG. 1 is a perspective view showing appearance of the disk unit according to Embodiment 1 of the present invention with its cover removed therefrom, and FIG. 2 is a top plan view showing the side of basic body of the disk unit shown in FIG. 1.

The disk unit 1 shown in FIG. 1 comprises a bath-tub type of base 11, a plurality sheets of disk 12 which are layered, a spindle motor 13 for rotating the plurality sheets of disk 12, a head actuator 14 comprising a carriage 15 with a head 16 for data read/write provided at a top thereof and a unit-side voice coil motor 17, and a cover 20 for covering the base 11 therewith from the upper side to shield it.

In the disk unit 1 as described above, a signal reproduced by the head 16 is led out to outside of the head actuator 14 by a flexible circuit board 18 attached to a side face of the carriage 15, and is guided onto the fixed board 19 projectedly provided on the bottom face of the base 11. A head IC (integrated circuit) for executing head select and amplifying a read signal and a write signal, and a servo IC for processing a servo signal are mounted on the fixed board 19.

Figure 2:
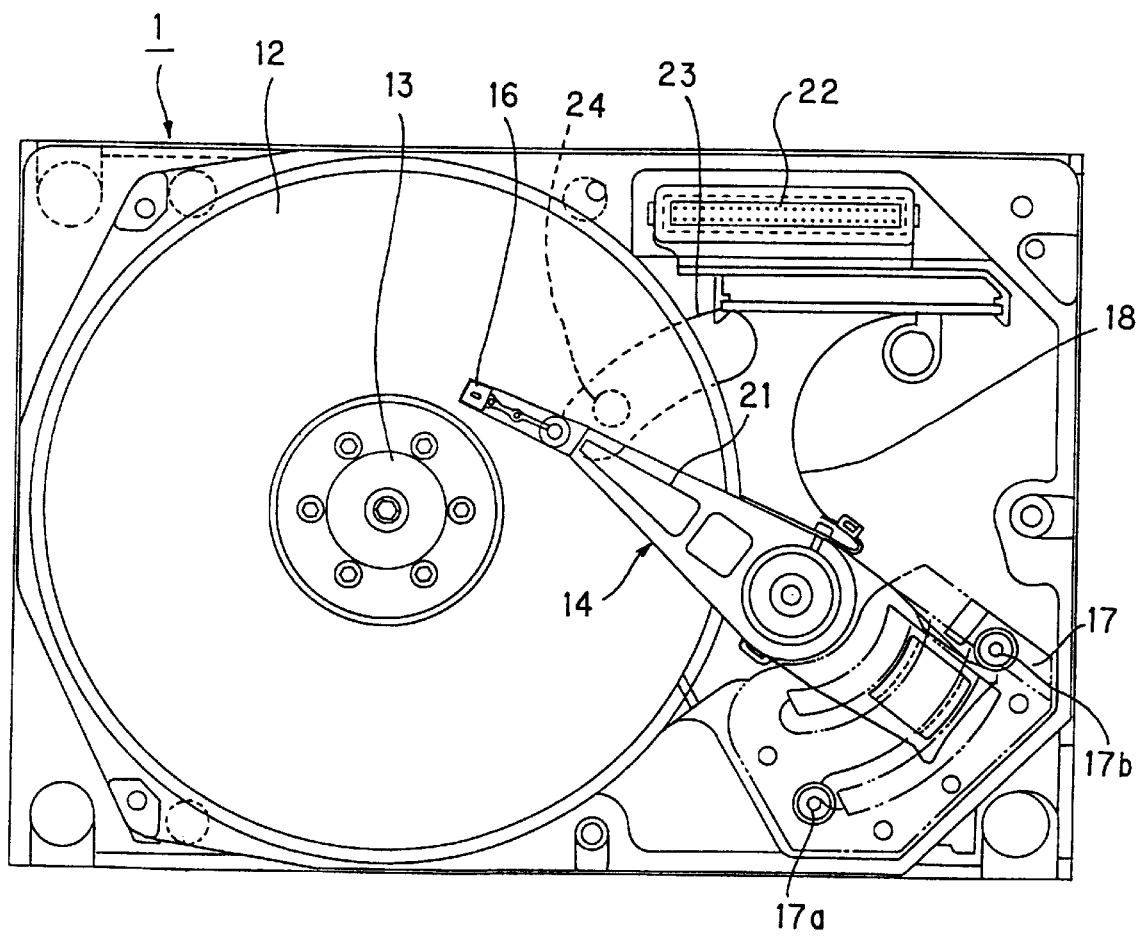
FIG. 2 is a top plan view showing the side of basic body of the disk unit shown in FIG. 1.

When the base 11 is viewed from the upper side, as shown in FIG. 2, an arc-shaped opening section 23 for a servo track write is provided on the bottom face of the base 11. This opening section 23 is a hole with a pin pick 24 mounted on a pin pick system of servo track writer, which is not shown in the figure, passed therethrough and for supporting a tip section of an arm 21 for the head actuator 14. The opening section 23 is formed in an arc shape to enable the pin pick 24 to move in the direction of the arc, and the arm 21 can be swung following the movement of the pin pick 24 when writing a servo track on a disk.

The head actuator 14 is driven by the voice coil motor 17 in the unit side during the normal operation for reading/writing data. Stoppers 17a, 17b for restricting a movable range to the outer side as well as to the inner side on the disk 12 respectively are provided in some places in the direction of movement of the rear section (opposite side to the arm 21 via a rotation axis) of the head actuator 14. When the head actuator 14 rotates in the clockwise direction, the edge thereof having moved by a certain range strikes the stopper 17a, and the position where the head 16 is present at that point of time is regarded as a position indicating a maximum movable range in the outer side. Also, when the head actuator 14 rotates in the counterclockwise direction, the edge thereof having moved by a certain range strikes the stopper 17b, and the position where the head 16 is present at that point of time is regarded as a position indicating a maximum movable range in the inner side.

Provided in the base 11 is a connector 22, and electric continuity to a servo track writer, not shown in the figure, can be established through this connector 22. To describe more specifically, servo data is transmitted from the servo track writer to the disk unit 1, and an operation for writing the servo data is executed in each disk 12 by each head 16.

Figure 3:
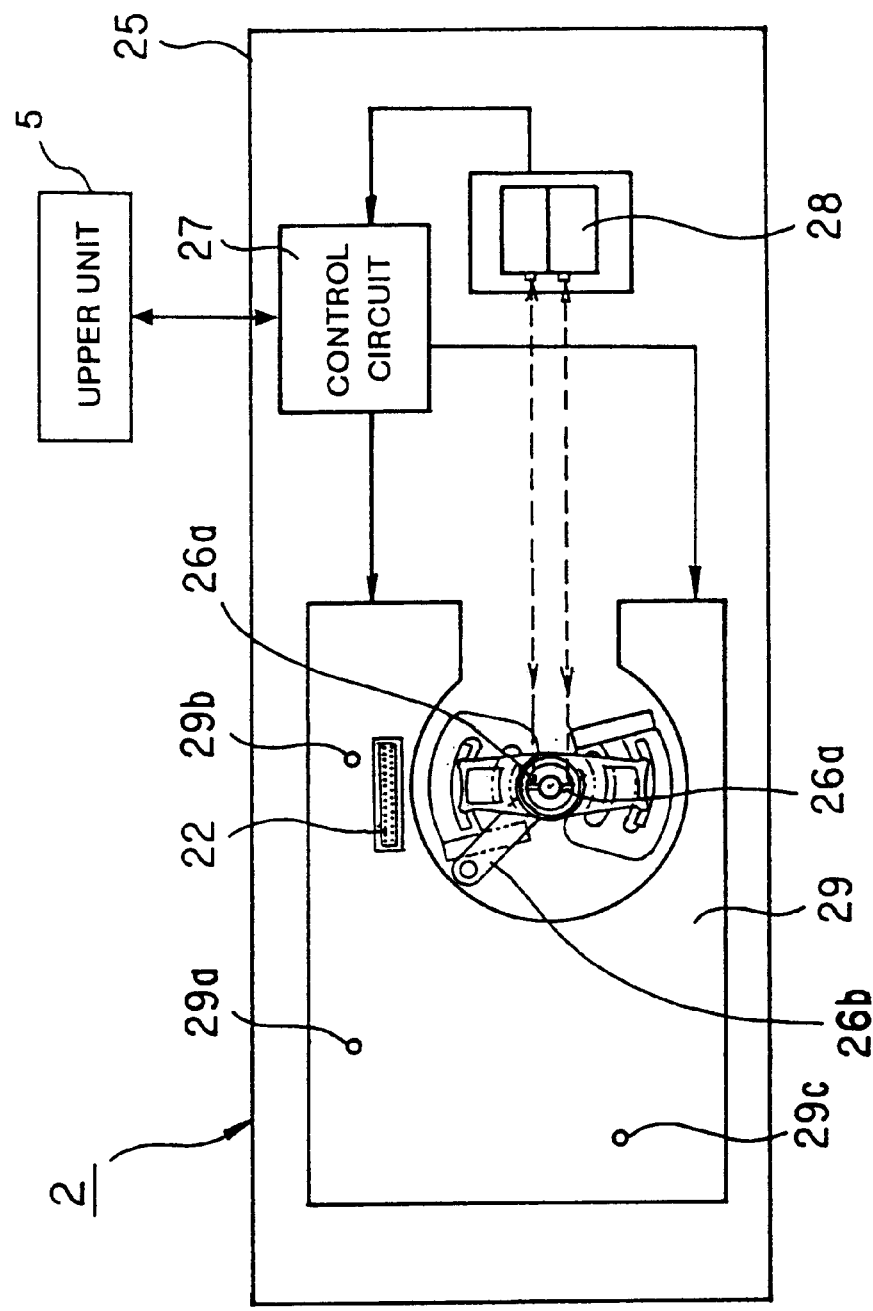
FIG. 3 is a top plan view schematically showing the servo track write system according to Embodiment 1.
Figure 4A:
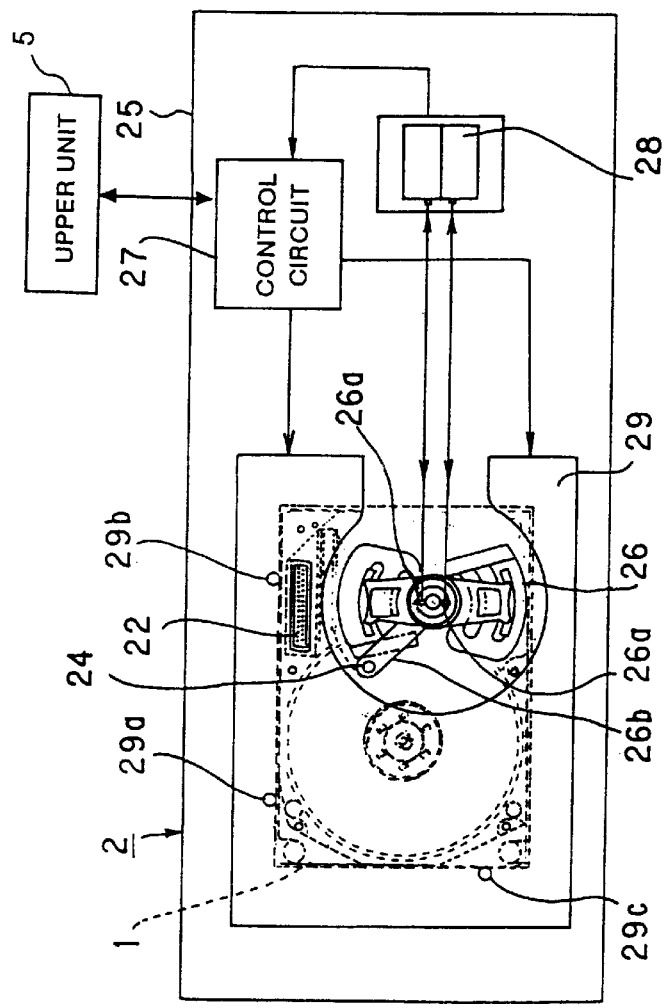
FIG. 4A is a top plan view showing a state where the disk unit is mounted on the servo track write system shown in FIG. 3.
Figure 4B:
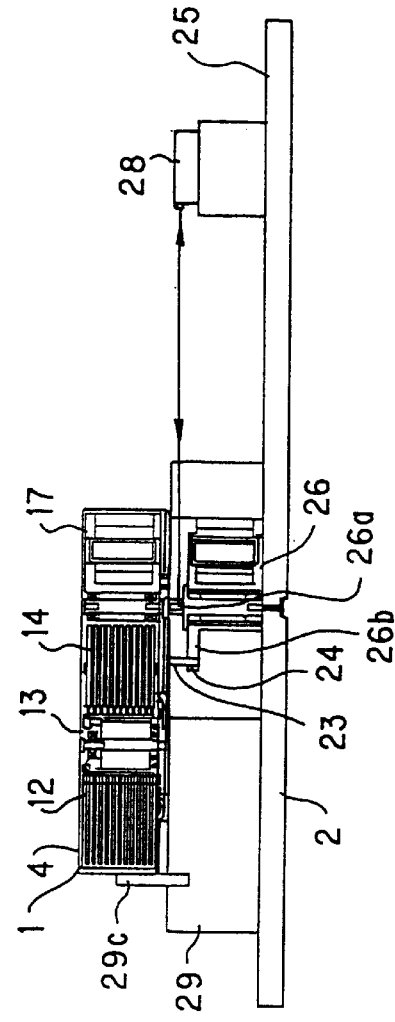
FIG. 4B is a side view of the same.

Next description is made for a method of mounting the disk unit on the servo track writer. FIG. 3 is a top plan view schematically showing a servo track write system according to Embodiment 1, and FIG. 4A and FIG. 4B are a top plan view and a side view respectively each showing a state where the disk unit is mounted on the servo track write system shown in FIG. 3.

The servo track write system shown in FIG. 3 comprises a servo track writer 2 and an upper unit 5 (computing unit). The servo track writer 2 mounts components on the board 25 thereof such as a writer-side voice coil motor 26 having a mirror 26a reflecting a laser beam for providing controls over positioning and an actuator for pin pick 26b with a pin pick 24 provided at the tip thereof, a control circuit 27 (recognizing unit, servo data write control unit) for providing controls over the writer-side voice coil motor in the writer side 26 or the like, and a laser displacement gauge 28 for measuring an angle of rotation for the actuator for pin pick 26b by letting the laser beam in the mirror 26a to measure the reflection.

The control circuit 27 having a microcomputer recognizes a movable range by controlling the head actuator 14 and obtains a pitch angle for each cylinder from the recognized movable range by using the upper unit 5.

The upper unit 5 is a computing unit such as a computer. This upper unit 5 computes a pitch angle for each cylinder according to data for the movable range of the head actuator 14 transmitted from the control circuit 27, and sends back the computed pitch angle to the control circuit 27.

The servo track writer 2 inserts, when writing data in a servo track, a pin-pick 24 within the disk unit 1 through an opening section 23 of the base 11 to install the disk unit 1 and have the edge section of the arm 21 for the head actuator 14 supported (Refer to FIG. 4A, FIG. 4B).

The control circuit 27 controls movement of the head actuator 14 by moving the actuator for pin pick 26b, namely by moving a position of the pin pick 24 with the writer-side voice coil motor 26 according to a result of a laser measured by the laser displacement gauge 28. In this case, the unit-side voice coil motor 17 is biased from the control circuit 27 so as to slightly press the head actuator 14 in the side of disk unit 1 against the pin pick 24.

With this bias, the head actuator 14 for the disk unit 1 moves in the same direction as that of the actuator for pin pick 26b for the servo track writer 2. Controls provided by the servo track writer 2 to recognize each stopper space in each disk unit are executed according to this bias control.

Figure 5:
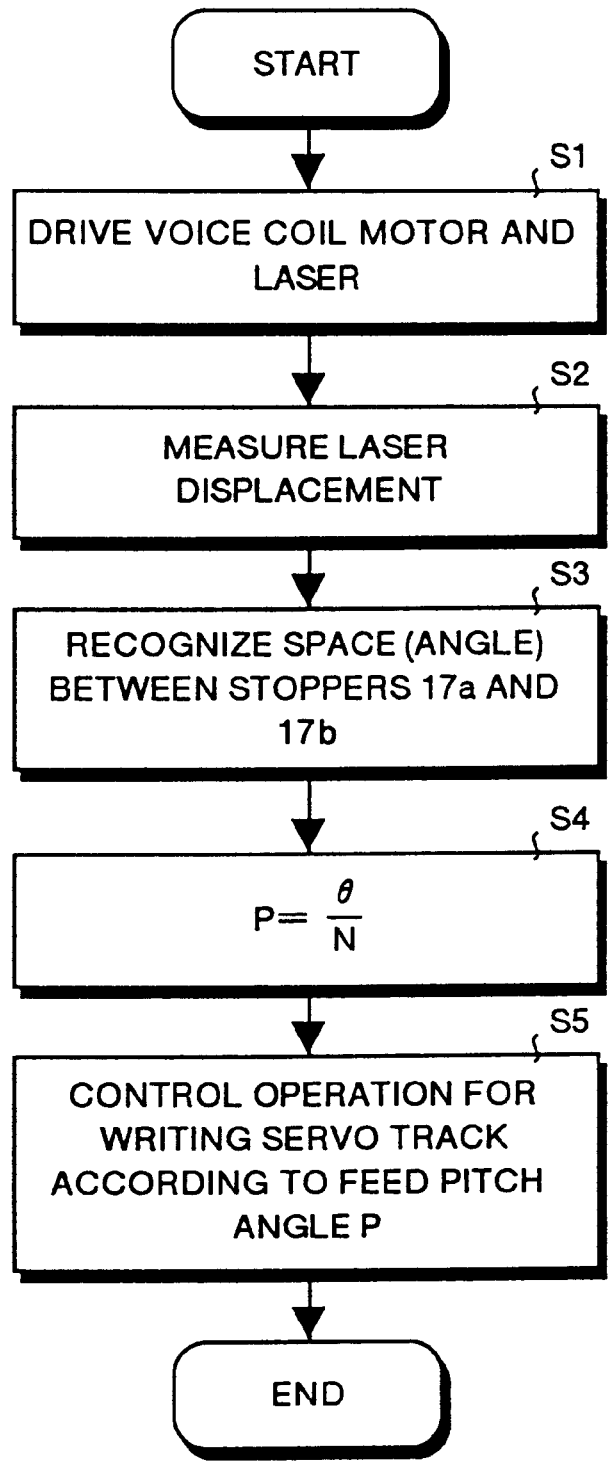
FIG. 5 is a flowchart for explaining the operation for writing data in servo track according to Embodiment 1.
Figure 6:
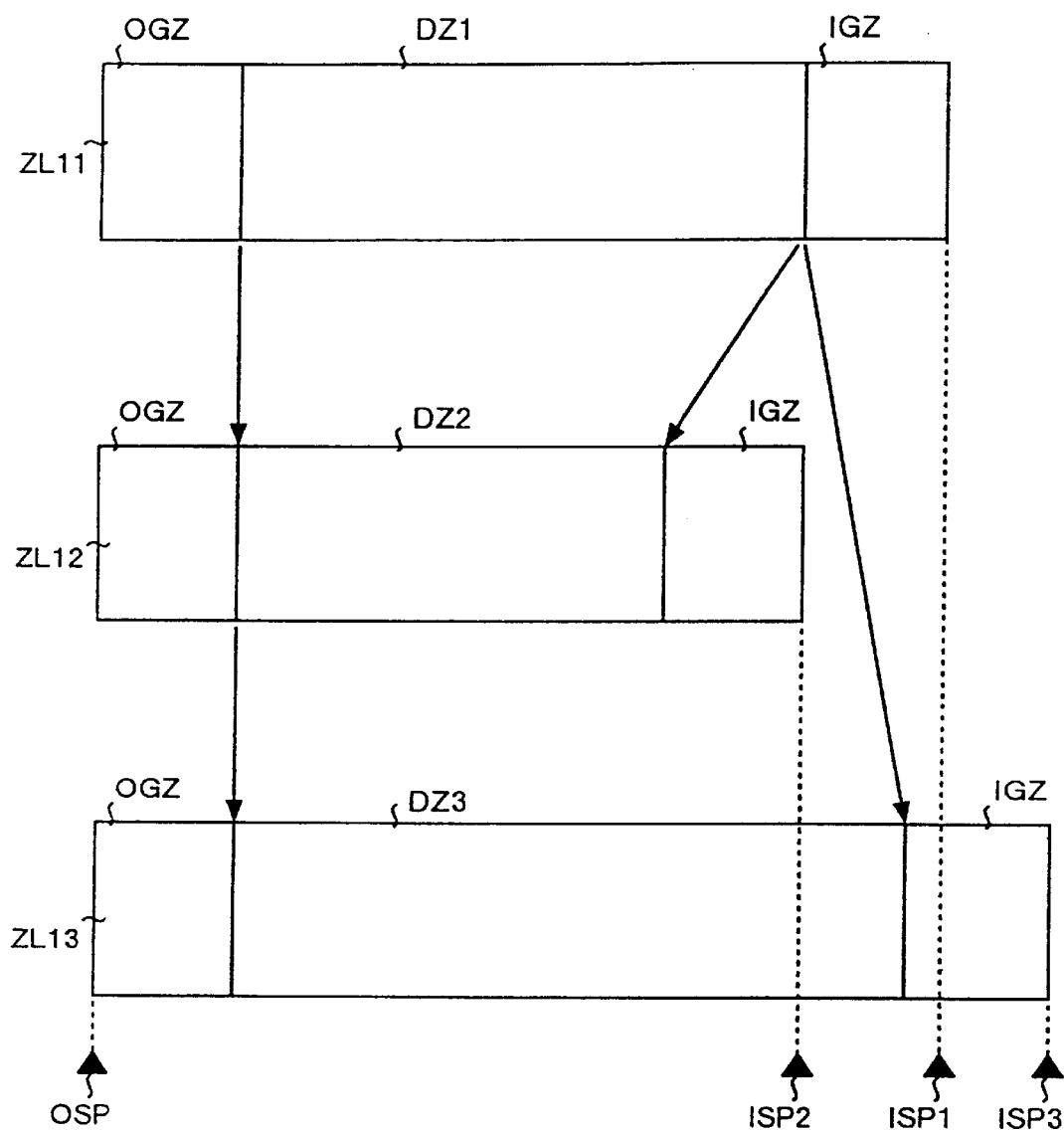
FIG. 6 is a view for explaining an example of zone layout according to Embodiment 1.
Figure 7A:
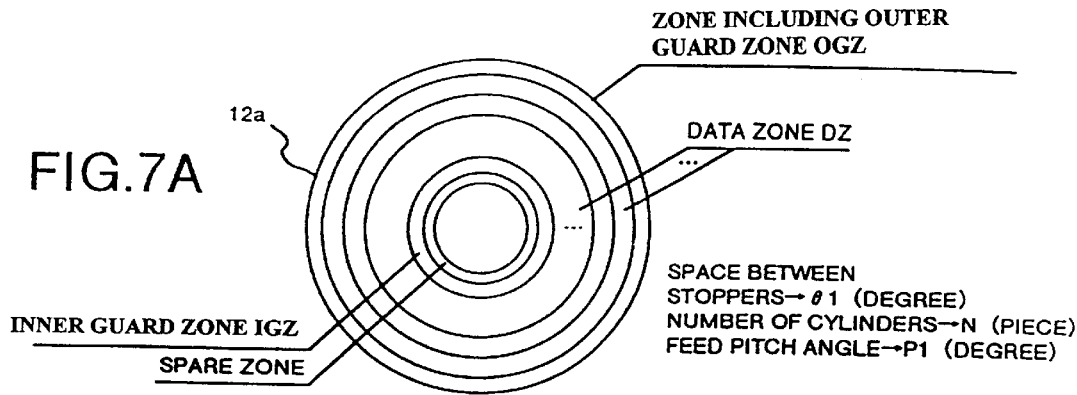
FIGS. 7A to 7C are views showing an arrangement of cylinders on a disk according to Embodiment 1.
Figure 7B:
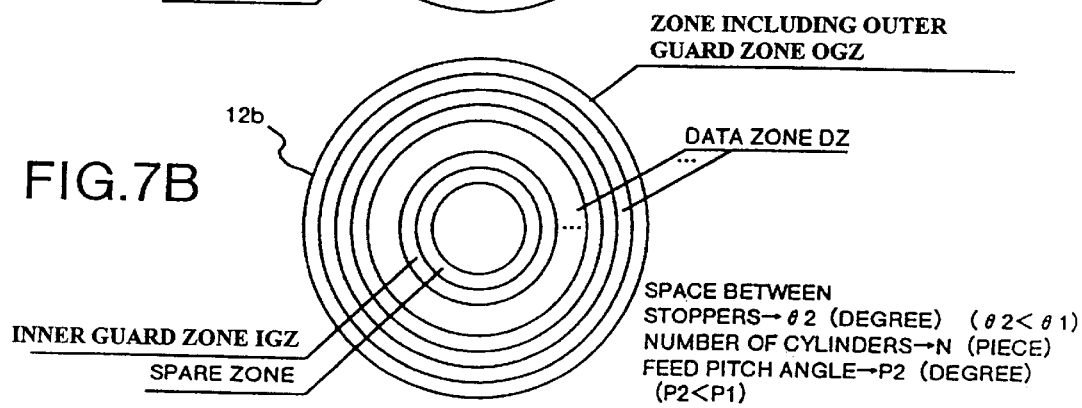
Figure 7C:
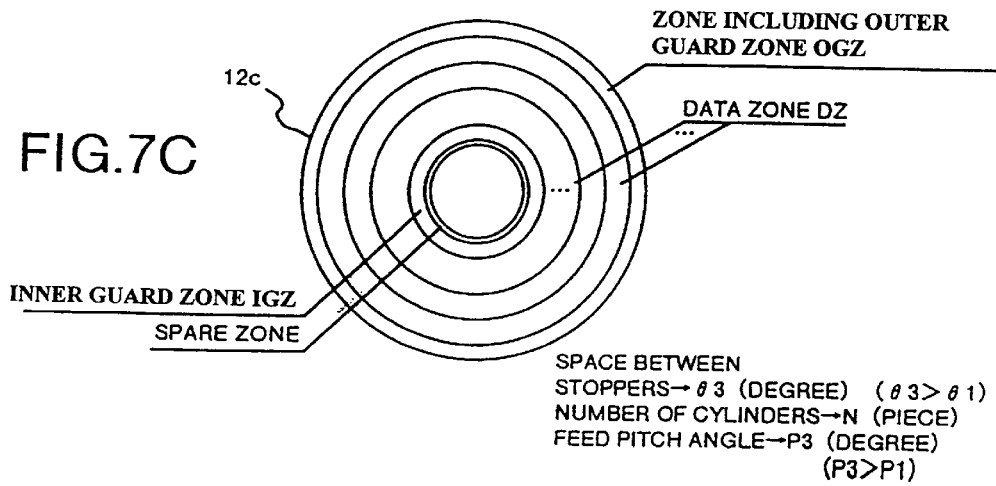
Figure 8:
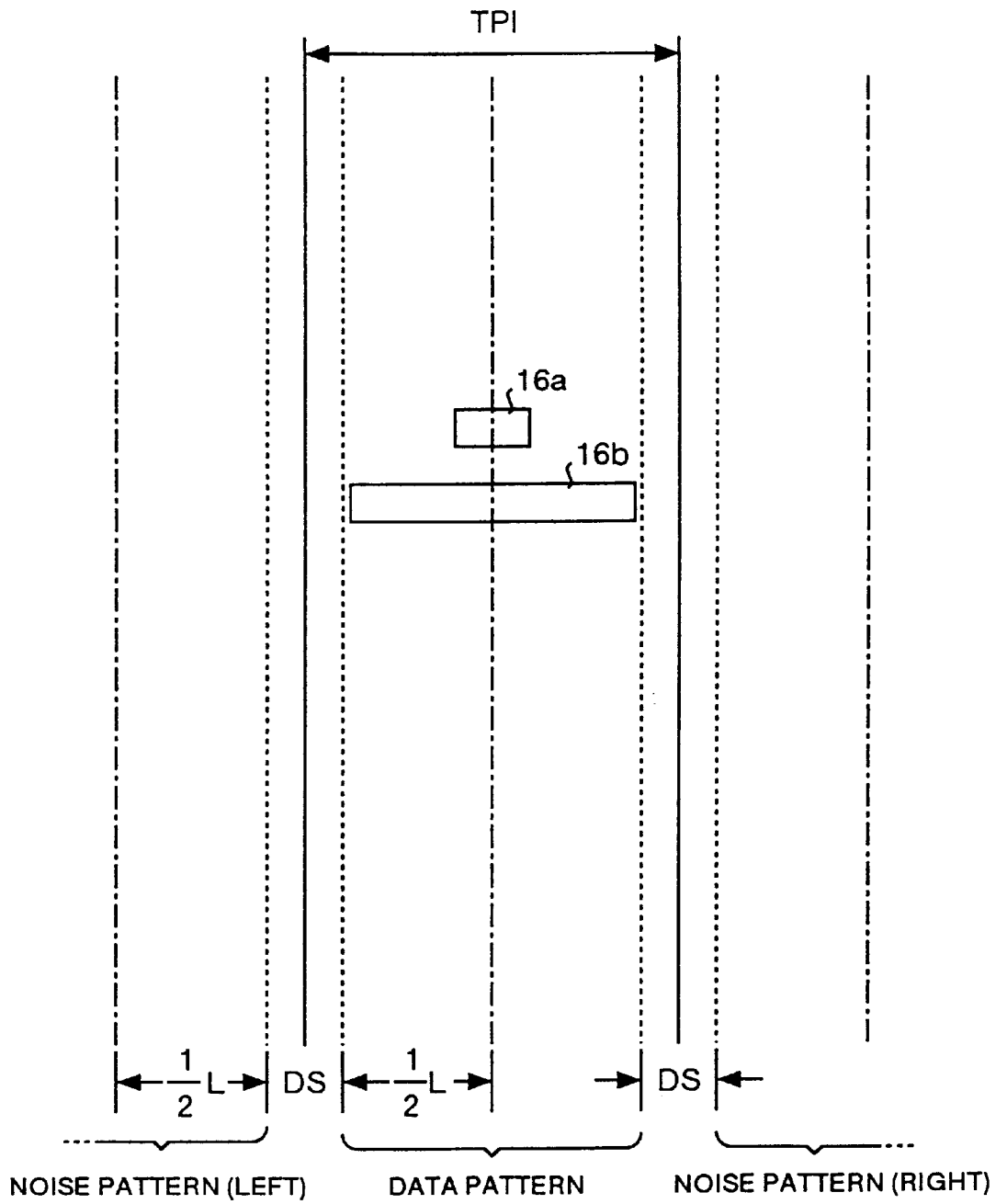
FIG. 8 is a view for explaining a method of increasing a TPI margin according to Embodiment 1.

Next description is made for a servo track write method. FIG. 5 is a flowchart for explaining an operation for writing data in a servo track according to Embodiment 1, FIG. 6 is a view for explaining an example of zone layout according to Embodiment 1, FIGS. 7A to 7C are views showing an arrangement of cylinders on the disk in the radial direction thereof according to Embodiment 1, and FIG. 8 is a view for explaining a method of increasing a TPI margin according to Embodiment 1.

Assembly of the disk unit 1 is completed by assembling components including the disk 12 with disks therein, head actuator 14 and the head 16 in the base 11, and as shown in FIG. 4, the disk unit 1 is positioned on a supporting base 29 of the servo track writer 2 with supporting members 29a, 29b, and 29c. After installation, the laser displacement gauge 28 is driven, and the writer-side voice coil motor 26 is driven by controlling by the control circuit 27 (step S1).

In this case, at first, a movable range of the head actuator 14 between the stoppers 17a and 17b is obtained. Therefore, the head actuator 14 is moved until it strikes the stoppers 17a, 17b in the outer side and in the inner side respectively.

The head actuator 14 is swung by the writer-side voice coil motor 26 of the servo track writer 2. At that point of time, the head actuator 14 moves in association with rotation of the actuator for pin pick 26b with a pin pick 24 thereon for supporting the head actuator 14 itself. A range of movement of the head actuator 14, namely a range of movement of the actuator for pin pick 26b is measured as an angle from an incident laser beam to the mirror 26a and a reflected beam thereof by the laser displacement gauge 28 (step S2).

With this measurement, a movable range (a space between the stoppers 17a and 17b) of the head actuator 14 is recognized by checking its each movement to the inner side as well as to the outer side as an angle specific to the disk unit 1. Then, assuming that the recognized angle is θ and a prespecified number of cylinders is N, the angle θ and the number of cylinders N are transmitted to the upper unit 5 (step S3).

Herein assuming a feed pitch angle when writing servo data is P, an expression of P=θ/N holds good. This expression is expression (1). Namely, the upper unit 5 computes a feed pitch angle P (an evenly divided angle) in an operation for writing servo data in each cylinder by evenly dividing an angle θ by a prespecified number of cylinders N (step S4).

As described above, when the feed pitch angle P is obtained by the upper unit 5, the pitch angle P is sent back to the control circuit 27. The control circuit 27 executes an operation for writing servo data in each specified disk according to the feed pitch angle P (step S5). A prespecified number of cylinders is decided by adding essential zones which are the outer guard band and inner guard band (a common size in each disk unit) to data cylinders constituting the data zone.

Description is made herein for examples of disks 12a, 12b, and 12c each having a different feed pitch angle P according to the stopper space 17a and 17b with reference to FIG. 6 and FIGS. 7A to 7C. FIG. 6 shows zone layouts ZL11, ZL12 and ZL13 of three types of disk 12a, 12b and 12c respectively on which operations for writing servo track are executed respectively each with a different stopper space making a comparison thereamong.

It should be noted that, to make description simple herein, the same reference numerals are used for those corresponding to the common sections in the comparison between Embodiment 1 and the example based on the conventional technology (FIG. 15 and FIGS. 16A to 16C). Sizes of the zone layouts ZL11, ZL12 and ZL13 correspond to those of the zone layouts ZL1, ZL2 and ZL3 so as to be capable of making a comparison with the conventional type thereof, and when the comparison is made by aligning positions of outer-side stoppers OSP to the left side (in the figure), positions of inner-side stoppers are away from the positions of the outer-side stoppers in the ascending order of ISP2, ISP1, and ISP3. Because of the difference in the stopper space, a relation of the sizes among the zone layouts ZL11, ZL12, and ZL13 each shown in FIG. 6 is as follows: ZL12 (narrowest stopper space)<ZL11 (intermediate stopper space)<ZL13 (widest stopper space).

The operation for writing data in a servo track on a disk requires, as already described, a condition in which a prespecified total number of cylinders is to be written on the disk regardless of any space between the stoppers, but the same number of data tracks is provided on each of the zone layouts ZL1, ZL2, and ZL3 with the same track pitch in the conventional type of writer, while in Embodiment 1, if a fixed-sized outer guard zone OGZ and a fixed-sized inner guard zone IGZ are insured, all space left between the zones OGZ and IGZ is used as a data zone.

Namely, each of the zone layouts ZL11, ZL12, and ZL13 does not have the same sized data zone DZ like in the conventional type thereof, but has each of data zones DZ1, DZ2 and DZ3 respectively as shown in FIG. 6. The relation among the sizes of the data zones DZ1, DZ2 and DZ3 shown in FIG. 6 is DZ2 (narrowest space between the stoppers 17a and 17b)<DZ1 (intermediate space between the stoppers 17a and 17b)<DZ3 (widest space between the stoppers 17a and 17b), and the difference among the sizes occurs due to a space between the stoppers 17a and 17b.

Practically, the relation described above among the zone layouts ZL11, ZL12 and ZL13 is as shown in FIG. 7A, FIG. 7B, and FIG. 7C, respectively. A spare zone corresponding to a range outside of the movable range of the head actuator 14 in the inner side exists in a space, in the radial direction of each of the disks 12a, 12b and 12c, from the inner circuit to a cylinder just starting the inner guard zone. There is no difference in this spare zone from that in the conventional type thereof because it has nothing to do with the range to be used, but an inner guard zone IGZ is set to a constant size in each disk, which makes wider any of the data zones DZ1, DZ2 and DZ3 between the outer guard zone OGZ and the inner guard zone IGZ as compared to that of the conventional type thereof.

The number of cylinders provided in each of the data zones DZ1, DZ2 and DZ3 is common, so that the difference among them is expressed by the feed pitch angle P. Namely, assuming that a disk number is i, a number of a disk 12a is 1, a number of a disk 12b is 2, and a number of a disk 12c is 3, by using the expression (1) of Pi=θi/N (N: constant), the following expressions are obtained, namely P1=θ1/N, P2=θ2/N, P3=θ3/N, respectively. As for a movable range of the head actuator 14, a relation of θ2<θ1<θ3 can be obtained from the space between the stoppers 17a and 17b shown in FIG. 6, and for a feed pitch angle, a relation of P2<P1<P3 can be obtained.

For the reasons as described above, according to the relation among feed pitch angles of the data zones ZD1, ZD2, and ZD3, a track pitch is increasingly widened in the order of the disks 12b, 12a, 12c. In other words, when the spare zone gets narrower, a wider track pitch can be acquired.

As described above, with Embodiment 1, a disk has the configuration in which an angle is obtained from a space between the stoppers 17a and 17b obtained by moving the head actuator 14, further a feed pitch angle for each cylinder is decided according to a prespecified number of cylinders from the angle, and servo data is written thereon according to the pitch angle. Accordingly, when the space between the stoppers 17a and 17b is more widened, the feed pitch angle becomes larger, with which a larger track pitch for each cylinder can be acquired, so that it is possible to make effective use of a spare region generated according to the stopper without fixing a track pitch.

When discretely setting a track pitch for each disk unit, the track pitch is set as wide as possible according to the stopper space specific to each disk unit, so that most disk units each having an average stopper space can insure a larger margin (described as TPI (Track Per Inch) margin hereinafter) as compared to that in the conventional technology to prevent destruction of recorded data in adjoining tracks by each of read/write heads mounted on each disk unit, which allows yields at a testing step to be improved and also reliability thereof to be improved.

In this case, as the number of cylinders is fixed, the capacity can not be increased, but the TPI margin in turn increases, which allows a margin against data destruction to is secured.

Next description is made herein for application of a dead space to a TPI margin. In FIG. 8, the reference numeral 16a indicates a read head for reading data, and the reference numeral 16b indicates a write head for writing data. The head 16 comprises those read head 16a and write head 16b. As one example, it is assumed that a core width of the write head 16b is 3.4 μm±0.3 μm, and a TPI for each track is 3.9 μm.

For example, in FIG. 8, the conventional type of disk having 6,000 cylinders can increase the number of cylinders by 300 cylinders according to Embodiment 1, and a constant value DS as a dead space is increased from 0.2 μm to 0.4 μm so that the TPI can be increased from 3.9 μm to 4.1 μm. As described above, if the TPI margin is increased by a required minimum value, displacement of a write position can be absorbed by the widened dead space even if an extra angle is added to the head 16, namely to the write head 16b, which makes it possible to prevent data from being written in adjoining tracks.

Also, an angle of the actuator for the disk unit is recognized by using the laser displacement gauge for writing servo data, so that the conventional technology is applicable to the present invention, which allows the need for any particular configuration for recognizing an angle to be eliminated.

The servo track writer executes, when writing servo data, measurement of a length by reflecting a laser beam emitted from the laser displacement gauge with the mirror of the actuator itself to the laser displacement gauge, and provides controls over positioning of the actuator for the disk unit using a pin pick according to the measured length, so that the need for attaching a mirror to a disk unit having been becoming increasingly smaller in recent years has been eliminated, and with this feature, the movement of an actuator in a disk unit side can more accurately be recognized by the servo track writer with configuration obtained simply by attaching the servo track writer to the disk unit.

A track pitch is provided as wide as possible within a maximum movable range of the head, so that a TPI margin larger as compared to that in the conventional technology can be acquired, and with this feature, yield at a testing step is improved and reliability thereof is also improved.

A position of each cylinder is decided according to the track pitch and servo data is recorded in a disk, so that a head can be positioned in each cylinder.

In addition, in Embodiment 1, servo data may duplicatedly be recorded by a specified pitch angle in the radial direction of a disk.

In Embodiment 1, a TPI margin may be acquired for each track pitch for improvement of reliability.

In Embodiment 1, each zone of the disk may comprise a different track pitch.

In Embodiment 1, a different track pitch may be applied in each face of the disk.

Also, before deciding a track pitch for data cylinders, cylinders required as guard bands in the inner side as well as in the outer side can be acquired without fail regardless of the total number of cylinders.

In Embodiment 1, a data zone is obtained by fixing the number of cylinders at a constant value, but like in Embodiment 2 described below, a data zone may be obtained by fixing a track pitch at a contact value. The configuration and form of the disk unit is the same as those in Embodiment 1 shown in FIG. 1 and FIG. 2, so that figures and description thereof are omitted herein, and description is made hereinafter only for operations different therefrom.

Figure 9:
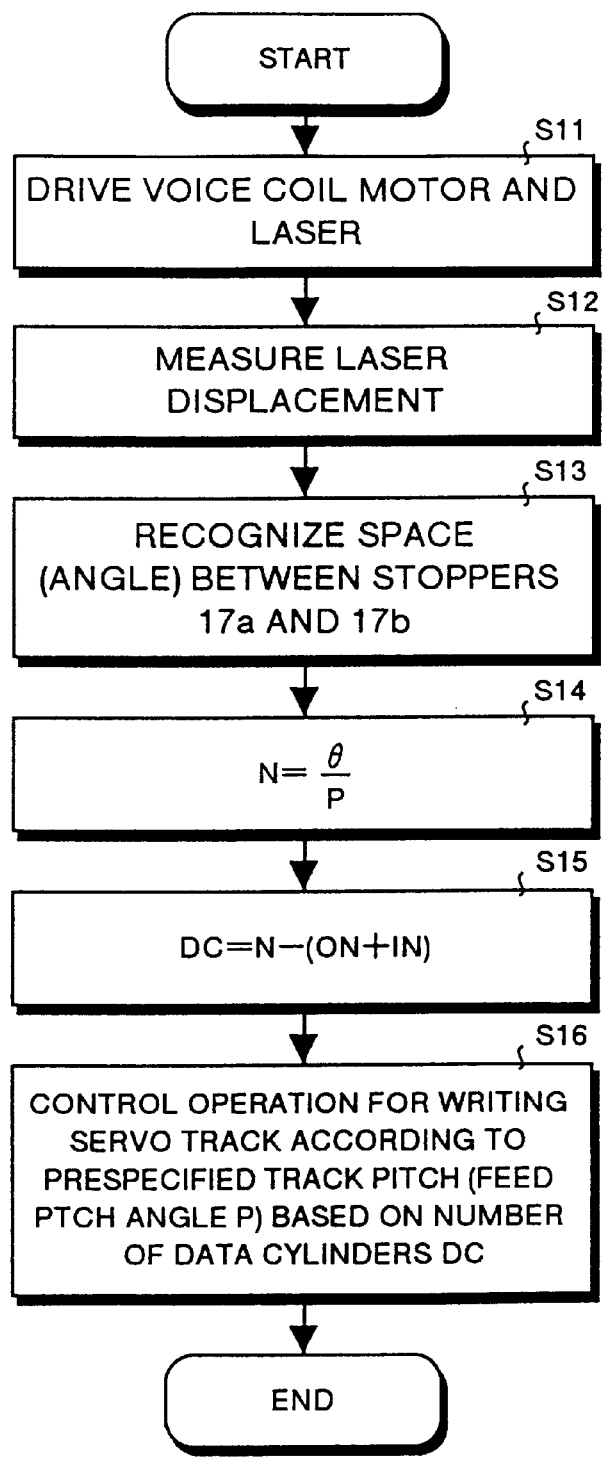
FIG. 9 is a flowchart for explaining an operation for writing data in a servo track according to Embodiment 2.
Figure 10A:
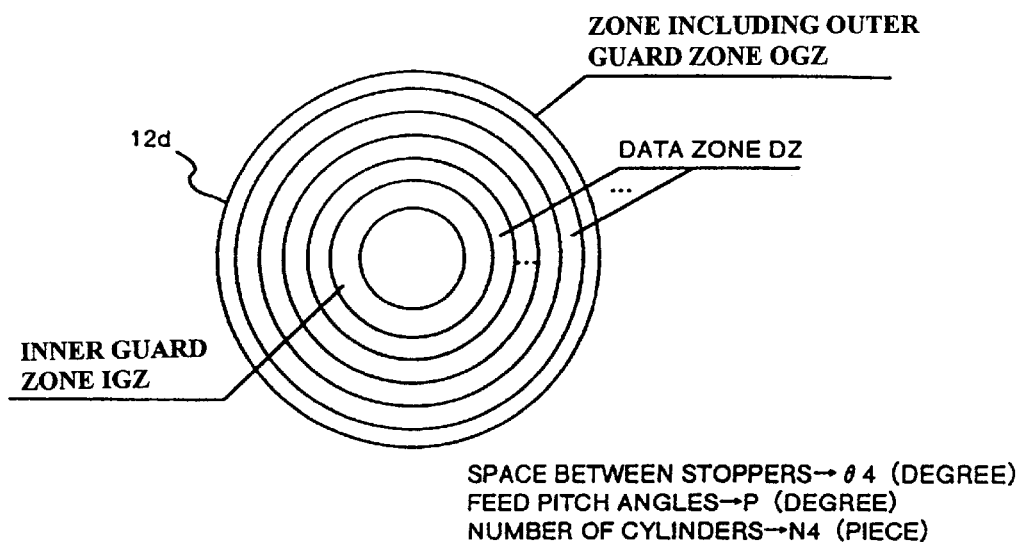
FIGS. 10A and 10B is a view showing an arrangement of cylinders on a desk according to Embodiment 2.
Figure 10B:
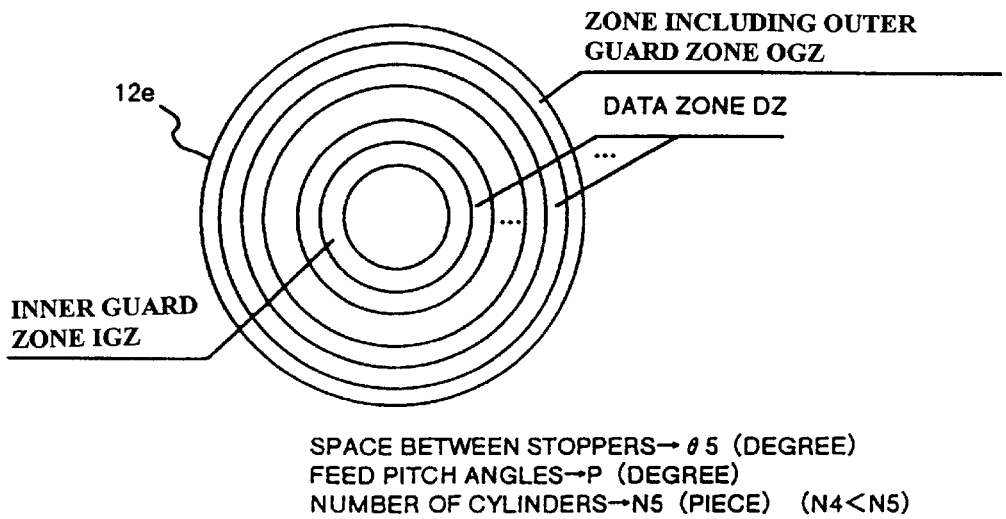

Description is made for operations with reference to FIG. 9 and FIGS. 10A and 10B. FIG. 9 is a flowchart for explaining an operation for writing data in a servo track according to Embodiment 2, and FIGS. 10A and 10B are views showing an arrangement of cylinders on a desk in the radial direction thereof according to Embodiment 2. The operations until recognizing a space between the stoppers 17a and 17b are also common to Embodiment 2.

Namely, similarly to Embodiment 1, after the disk unit 1 is installed on the servo track writer 2, the laser displacement gauge 28 is driven, and the voice coil motor 26 is driven by control by the control circuit 27 (recognizing unit, servo data write control unit) (step S11). With these operations, the control circuit 27 measures a range of movement of the actuator for pin pick 26b as an angle from an incident laser beam to the mirror 26a as well as the reflection thereof with the laser displacement gauge 28 (step S12). The control circuit 27 recognizes, with this measurement, a movable range (a space between the stoppers 17a and 17b) of the head actuator 14 from its each movement to the inner side as well as to the outer side as an angle specific to the disk unit 1 (step S13)

In Embodiment 2, assuming that an angle is θ, a prespecified number of cylinders is N and a feed pitch angle when writing servo data is P, an expression of N=θ/P holds good (This expression is set to (2)). In Embodiment 2, the angle θ and the pitch angle P are sent from the control unit 27 to the upper unit 5 (computing unit). Therefore, the upper unit 5 obtains the total number of cylinders according to the expression (2). Namely, the upper unit 5 evenly divides the angle θ by the prespecified pitch angle P and computes the total number of cylinders that can be provided according to the above operation (step S14).

When the total number of cylinders is obtained by the upper unit 5 as described above, the total number of cylinders is sent back to the control circuit 27. The control circuit 27 subtracts the number of cylinders ON for the outer guard band and the number of cylinders IN for the inner guard band from the total number of cylinders to obtain the number of data cylinders DC for a data zone (step S15). As described above, an operation for writing servo data in a specific disk is executed according to the prespecified track pitch based on the number of data cylinders DC (step S16).

Description is made herein for examples of two types of disk 12d, 12e each having a different number of data cylinders DC according to a space between the stoppers 17a and 17b with reference to FIGS. 10A and 10B. It should be noted that the data zone can be acquired according to the space between the stoppers 17a and 17b like in Embodiment 1, so that description of the relation between a data zone and a spare zone is omitted herein. To make description simpler, it is assumed herein that the disk 12d has the zone layout ZL11 and the disk 12e has the zone layout ZL13 respectively.

The feed pitch angle P provided in each of the data zones DZ1 and DZ2 for the disks 12d and 12e is common to Embodiment 2, so that the difference between them is expressed by the number of cylinders N. Namely, assuming that the disk number is i, a number of the disk 12d is 4, and a number of the disk 12e is 5, expressions are obtained as follows, by using the expression (2) of $N_i=\theta_i/P$ (P: constant), the following expressions are obtained, namely $N_4=\theta_4/P$, and $N_5=\theta_5/P$.

As for a movable range of the head actuator 14, a relation of $\theta_5>\theta_4$ can be obtained from the space between the stoppers 17a and 17b shown in FIG. 6, so that, for the number of cylinders, a relation of $N_5>N_4$ can be obtained. Accordingly, the disk 12e has a larger number of tracks than that in the disk 12d according to the relation of the number of cylinders between the data zones DZ1 and DZ3. In other words, when the spare zone gets narrower, a larger number of tracks can be acquired.

Figure 11:
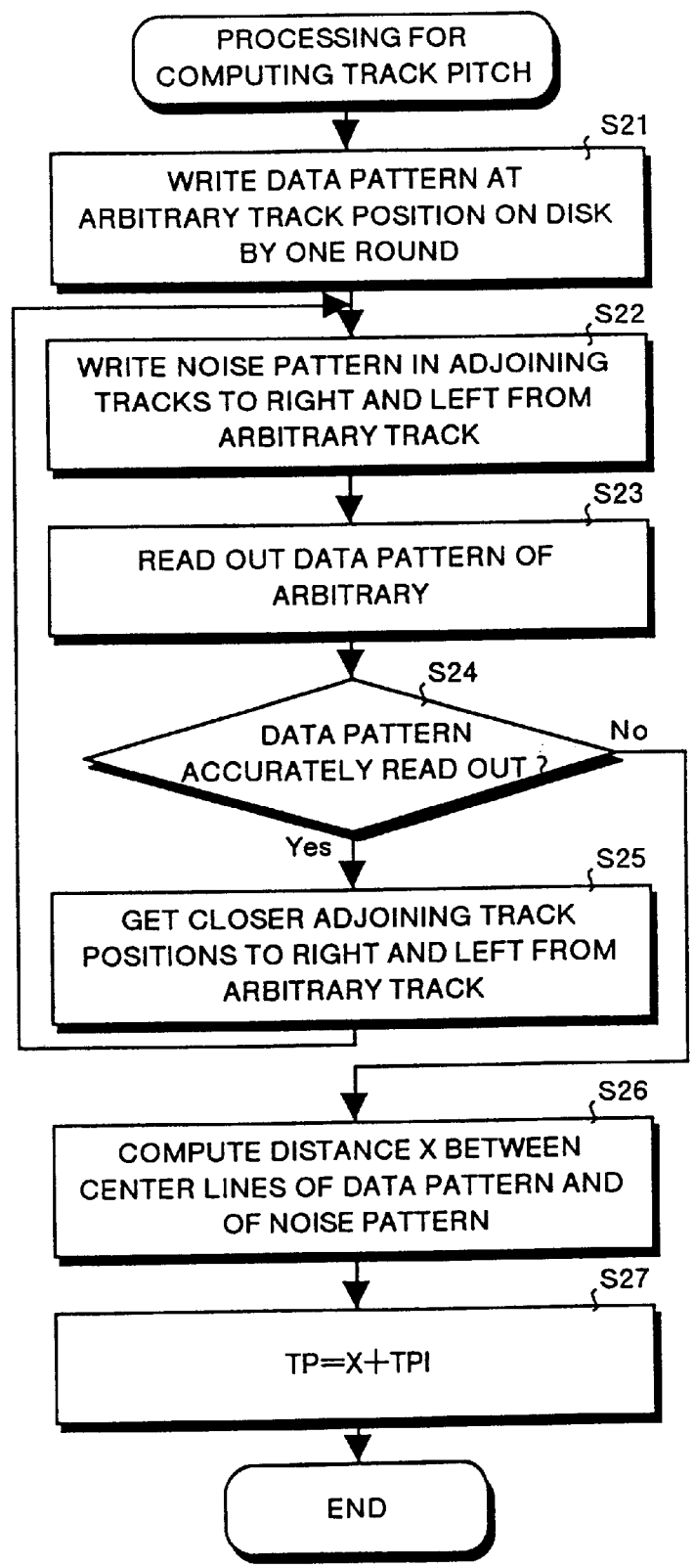
FIG. 11 is a flowchart for explaining the processing for computing a track pitch according to Embodiment 2.

Next description is made for a method of obtaining a track pitch. FIG. 11 is a flowchart for explaining the processing for computing at rack pitch according to Embodiment 2. In order to obtain a track pitch, at first a data pattern is written at an arbitrary track position on a disk by one round by using a temporary track pitch (step S21).

At the point of time, the head actuator 14 is controlled for positioning by the control circuit 27, and an operation for writing data is executed by the head 16. Then, noise patterns are written also by the head 16 in the adjoining tracks to the right as well as to the left from the track in which the data pattern is written (step S22).

After the noise patterns are written therein in step S22, the data pattern written in the arbitrary track position is read out by the head 16 (step S23). In this case, when the data pattern written in the arbitrary track position is coincident to the data pattern read therefrom so that the data pattern can accurately be read out (step S24), a position of a track in which a noise pattern is written is set to a position further closer to the arbitrary track position in order to narrow the space between the noise pattern and the data pattern (step S25).

Then, the processing from step S22 to step S24 is executed again. A position in which a noise pattern is written is, while the data pattern can accurately be read in step S24, gradually got closer to the data pattern in step S25.

Then, when the data pattern can not eventually be read (step S24), a distance X between a central line of the data pattern and a central line of the noise pattern at that time is computed (step S26). Then a distance between the centers of zones, in which data is written, in the adjoining cylinders, namely a track pitch TP is obtained by adding a required minimum TPI margin to the distance X (step S27).

As described above, with Embodiment 2, when the space between the stoppers 17a and 17b is more widened, a larger number of cylinders are provided on the disk, with which the number of cylinders as an object for writing servo data therein can be increased. In this case, it is possible to make effective use of a spare region generated according to the space between stoppers without the necessity of fixing a data zone by fixing the number of cylinders as an object for writing servo data to a constant value.

Especially, when the number of data cylinders is discretely set in each disk unit, the number of data cylinders is set as many as possible according to a stopper space in each disk unit, so that most disk units each having an average stopper space therebetween can insure a larger number of data cylinders as compared to that in the conventional method. With this feature, spare data cylinders can be made effective use of by using as a spare region or the like. In this case, as a capacity increases in association with increase of a number of data cylinders, the recording density can be made higher.

By previously removing cylinders required for providing an inner guard band in the inner side, cylinders required as the guard bands in the inner side as well as in the outer side can be acquired without fail regardless of the total number of cylinders.

As a required minimum track pitch is obtained so that data can be read out without fail, it is possible to prevent data destruction in a track generated due to a narrow track pitch, which allows reliability of the unit to be improved.

A position of each cylinder is decided according to the total number of cylinders and servo data is recorded in a disk, so that a head can be positioned in each cylinder.

Servo data may duplicatedly be recorded by a specified pitch angle in the radial direction of a disk.

Before deciding the total number of data cylinders, the number of cylinders required as guard bands in the inner side as well as in the outer side can be acquired without fail regardless the total number of cylinders.

In addition, each face of a disk may have the different total number of cylinders respectively.

In Embodiments 1 and 2, positioning of an actuator for a disk unit is controlled according to movement of an actuator for the servo track writer itself, but like in Embodiment 3 described below, positioning of the actuator for the disk unit may be controlled according to movement of the actuator for the disk unit itself. Description is made hereinafter only for the difference in the configuration as compared to that in the two embodiments described above.

Figure 12:
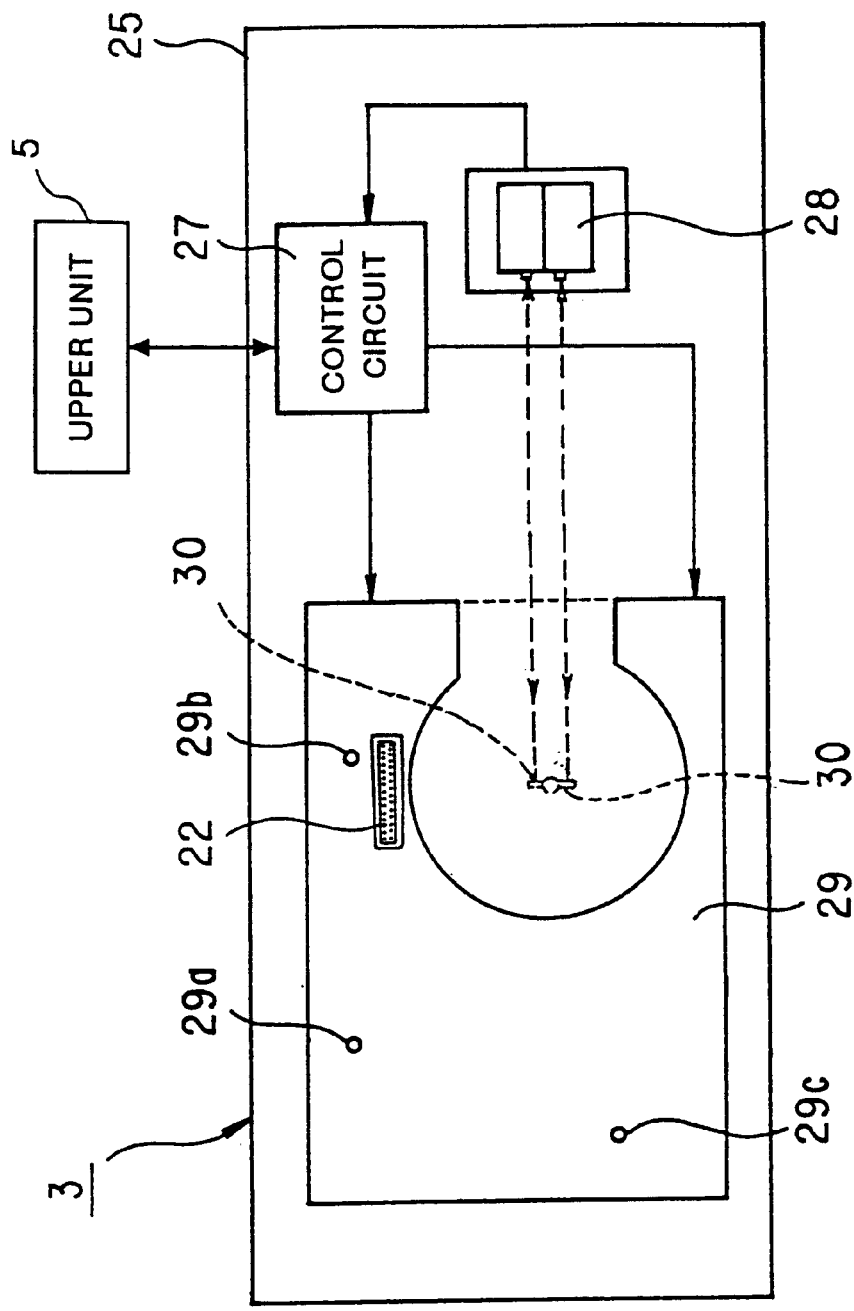
FIG. 12 is a top plan view schematically showing the servo track write system according to Embodiment 3.
Figure 14:
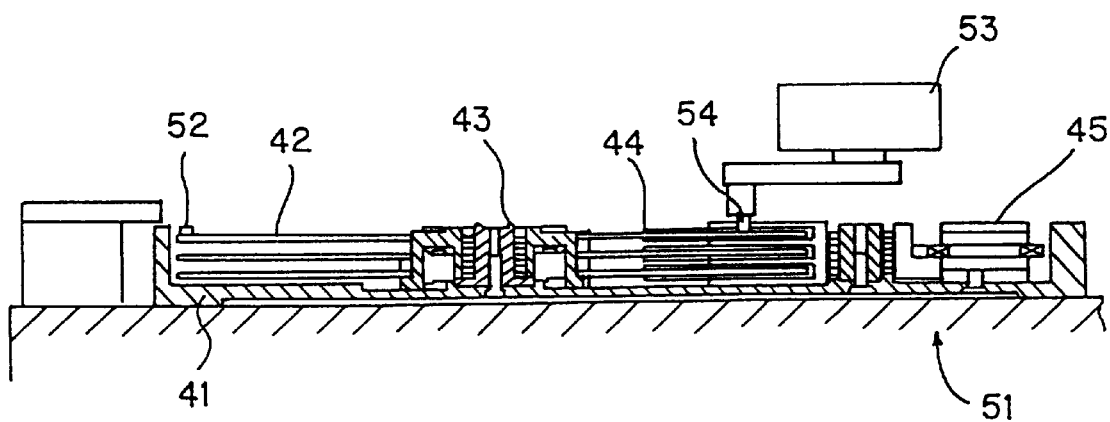
FIG. 14 is a cross-sectional view schematically showing configuration in which the conventional type of disk unit is mounted on the servo track writer.
Figure 15:
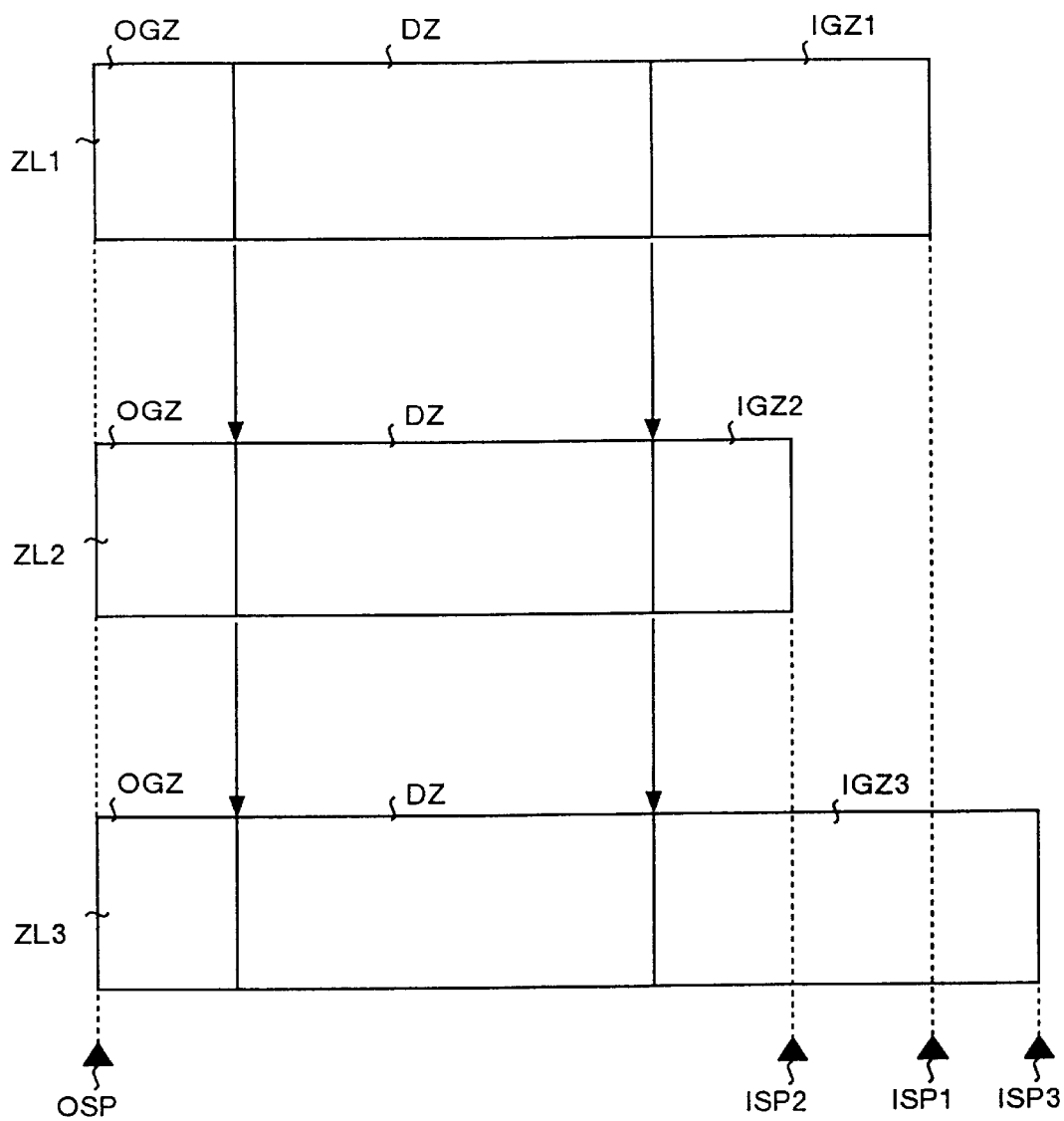
FIG. 15 is a view showing an example of zone layout on a disk according to the example based on the conventional technology.
Figure 16A:
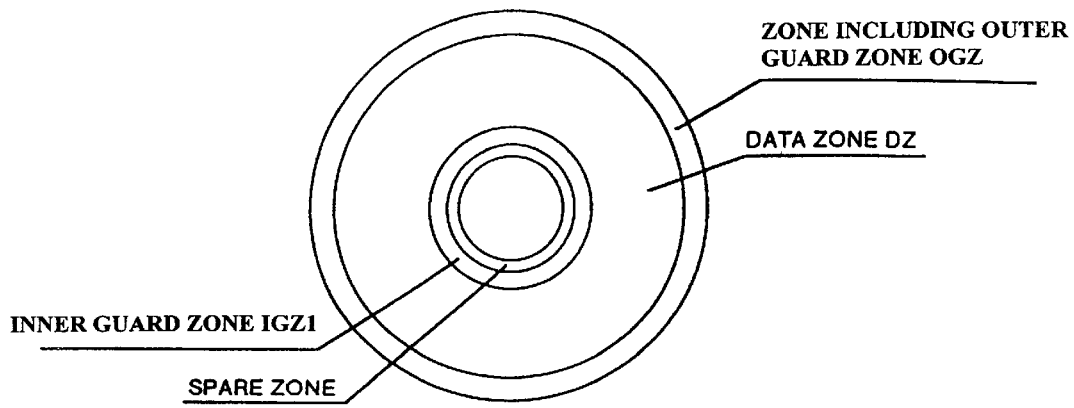
FIGS. 16A to 16C are views each showing an example of an arrangement of servo data on a disk according to the example based on the conventional technology.
Figure 16B:
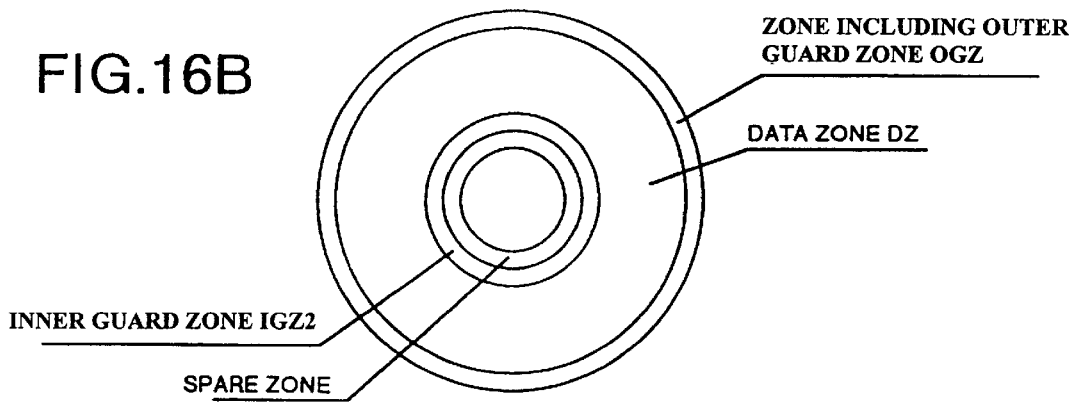
Figure 16C:
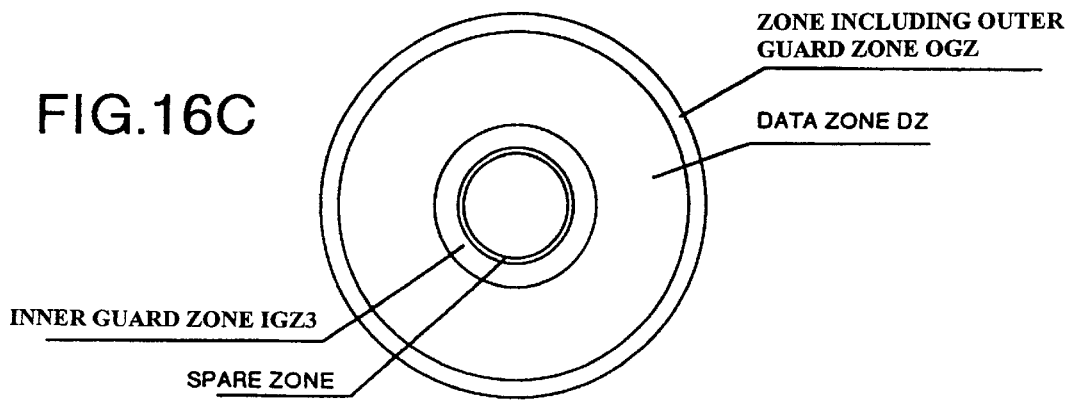

Brief description is made for a servo track write system with reference to FIG. 12 and FIGS. 13A and 13B. FIG. 12 is a top plan view schematically showing a servo track write system according to Embodiment 3, and FIG. 13A and FIG. 13B are a top plan view and a side view respectively each showing a state where the disk unit is mounted on the servo track write system shown in FIG. 12.

In Embodiments 1 and 2, the writer-side voice coil motor 26 is mounted on the servo track writer 2, but in Embodiment 3, a system of attaching a mirror to a disk unit is employed in place of employing the pin pick system, so that the voice coil motor is not required for the servo track writer. For this reason, an opening section for a pin pick is not required for a disk unit 4 as well.

In the disk unit 4, as shown in FIG. 13B, a mirror 30 is attached to the lower section of the head actuator 14. The laser displacement gauge 28 for a servo track writer 3 executes measurement with a laser by using this mirror 30. Then the control circuit 27 issues a control signal for positioning of the head actuator 14 only to the unit-side voice coil motor 17 for the disk unit 4 because there is no voice coil motor in the servo track writer 3.

As for operations, an object over which the control circuit 27 provides controls is only the unit-side voice coil motor 17 for the disk unit 4, and other operations are the same as those in Embodiments 1 and 2 except that measurement of an angle of a stopper space is obtained from a rotational angle of the head actuator 14 itself.

As described above, with Embodiment 3, the servo track writer 3 executes, when writing servo data, measurement of a length by reflecting a laser beam emitted from the laser displacement gauge 28 with the mirror 30 attached to the head actuator 14 for the disk unit 4 to the laser displacement gauge 28, and provides controls over positioning of the head actuator 14 according to the measured length, so that the movement of the head actuator 14 can be checked by the mirror 30 on the head actuator 14, and with this feature, the movement of the head actuator 14 in the side of disk unit 4 can accurately be recognized by the servo track writer 3.

As described above, with the disk unit according to the present invention, a track pitch is provided as wide as possible within a maximum movable range of the head, so that a TPI margin can be acquired more largely than that based on the conventional technology, and with this feature, it is possible to obtain a disk unit in which yield at a testing step is improved and reliability thereof is also improved.

With the disk unit according to the present invention, it is possible to obtain a disk unit in which a position of each cylinder is decided according to a track pitch and servo data is recorded in a disk so that a head can be positioned in each cylinder.

With the disk unit according to the present invention, it is possible to obtain a disk unit in which servo data can be duplicatedly recorded by a specified pitch angle in the radial direction of a disk.

With the disk unit according to the present invention, it is possible to obtain a disk unit in which a TPI margin can be acquired for each track pitch so that reliability thereof is improved.

With the disk unit according to the present invention, it is possible to obtain a disk unit in which each zone of the disk comprise a different track pitch.

With the disk unit according to the present invention, it is possible to obtain a disk unit in which a different track pitch is applied in each face of a disk.

With the disk unit according to the present invention, it is possible to obtain a disk unit in which, before deciding a track pitch for data cylinders, cylinders required as guard bands in the inner side as well as in the outer side can be acquired without fail regardless of the total number of cylinders.

With the disk unit according to the present invention, it is possible to obtain a disk unit in which higher capacity of a disk can be achieved by increasing the total number of cylinders as compared with those based on the conventional technology.

With the disk unit according to the present invention, it is possible to obtain a disk unit in which a position of each cylinder is defined by the total number of cylinders and servo data is recorded in a disk so that a head can be positioned in each cylinder.

With the disk unit according to the present invention, it is possible to obtain a disk unit in which servo data can duplicatedly be recorded by a specified pitch angle in the radial direction of a disk.

With the disk unit according to the present invention, it is possible to obtain a disk unit in which, before deciding the total number of data cylinders, the number of cylinders required as guard bands in the inner side as well as in the outer side can be acquired without fail regardless of the total number of cylinders.

With the disk unit according to the present invention, it is possible to obtain a disk unit in which each face of a disk has a different total number of cylinders respectively.

With the servo track write system according to the present invention, a feed pitch angle becomes larger in association with a wider space between stoppers, with which a larger track pitch for each cylinder is insured, and with this feature, it can be prevented that a track pitch is fixed, and it is possible to obtain a servo track write system in which a spare region generated according to a stopper space can be made effective use of.

With the servo track write system according to the present invention, the number of cylinders provided on the disk is increased in association with a wider space between stoppers, with which the number of cylinders in which servo data is to be written can be increased, so that it is possible to obtain a servo track write system in which a larger capacity of a disk can be achieved.

With the servo track write system according to the present invention, the number of cylinders in which servo data is to be written is decided by subtracting the number of cylinders required for providing an outer guard band in the outer side and an inner guard band in the inner side from the total number of cylinders, so that it is possible to obtain a servo track write system in which the cylinders required as the guard bands in the inner side as well as in the outer side can be insured without fail regardless of whether the total number of cylinders is a large number or not.

With the servo track write system according to the present invention, an angle of an actuator for the disk unit is recognized to write servo data therein by using a laser displacement gauge, so that existing technology may be applicable to the invention as it is, and it is possible to obtain a servo track write system which does not require any particular configuration for recognition of an angle.

With the servo track write system according to the present invention, the movement of an actuator can be checked by a mirror on the actuator, so that it is possible to obtain a servo track write system in which the movement of an actuator in the side of disk unit can more accurately be recognized by the servo track writer.

With the servo track write system according to the present invention, the need for attaching a mirror to a disk unit having been becoming increasingly smaller in recent years is eliminated, so that it is possible to obtain a servo track write system in which the movement of an actuator in the side of disk unit can more accurately be recognized by the servo track writer with configuration obtained simply by attaching the servo track writer.

With the servo track write method according to the present invention, a feed pitch angle becomes larger in association with a wider space between stoppers, with which a larger track pitch for each cylinder is insured, and with this feature, it can be prevented that a track pitch is fixed, and it is possible to obtain a servo track write method in which a spare region generated according to a stopper space can be made effective use of.

With the servo track write method according to the present invention, a required minimum track pitch is obtained so as to enable accurate reading of data, so that it is possible to obtain a servo track write method in which data destruction in a track generated due to a narrow track pitch can be prevented and reliability thereof can be improved.

With the servo track write method according to the present invention, the number of cylinders provided on a disk can be increased in association with a wider space between stoppers, with which the number of cylinders in which servo data is to be written can be increased, so that it is possible to obtain a servo track write method in which higher capacity of a disk can be achieved.

This application is based on Japanese patent application No. HEI 9-221278 filed in the Japanese Patent Office on Aug. 18, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A servo track write system for a disk unit having a head for at least reading data stored in a disk, a head actuator for moving said head in a radial direction of said disk, and a pair of stoppers for restricting movement of said head actuator to an inner side as well as to an outer side of said disk and also restricting a maximum movable range of said head, said servo track write system comprising:

a recognizing unit for moving the head actuator until it strikes the stoppers in the inner side and in the outer side to recognize a movable range of the head actuator;

a computing unit which computes a pitch angle that differs according to the movable range recognized by said recognizing unit; and a servo data write control unit for controlling an operation for writing servo data on said disk according to the pitch angle obtained by said computing unit.

2. A servo track write system according to claim 1; wherein said recognizing unit recognizes an angle of said head actuator for said disk unit by using a laser displacement gauge.

3. A servo track write system according to claim 2; wherein said actuator has a mirror, said servo track write system has said laser displacement gauge, and said servo data write control unit executes, when writing servo data, measurement of a length by reflecting a laser beam emitted from said laser displacement gauge with said mirror to said laser displacement gauge, and provides controls over positioning of said head actuator according to the measured length.

4. A servo track write system according to claim 2; wherein said servo track write system has said laser displacement gauge, mirror and an actuator with a pin pick, and said servo data write control unit executes, when writing servo data, measurement of a length by reflecting a laser beam emitted from said laser displacement gauge with said mirror to said laser displacement gauge and provides controls over positioning of said actuator for said disk unit by using said pin pick provided in said actuator of said servo track write system according to the measured length.

5. A servo track system according to claim 1, wherein said servo data is duplicatedly recorded at a specified pitch angle in the radial direction of said disk.

6. A servo track system according to claim 1, wherein said disk comprises a plurality of zones and each of said zone has a different track pitch respectively.

7. A servo track write method for a disk unit having a head for at least reading data stored in a disk, a head actuator for moving said head in a radial direction of said disk, and a pair of stoppers for restricting movement of said head actuator to an inner side as well as to an outer side of said disk and also restricting a maximum movable range of said head, said method comprising:

a first step of moving the head actuator until it strikes the stoppers in the inner side and in the outer side to recognize a movable range of the head actuator;

a second step of computing a pitch angle that differs according to the movable range recognized in said first step; and a third step of providing controls over an operation for writing servo data in said disk according to the pitch angle obtained in said second step.

8. A servo track write method for a disk unit having a head for at least reading data stored in a disk, a head actuator for moving said head in a radial direction of said disk, and a pair of stoppers for restricting movement of said head actuator to an inner side as well as to an outer side of said disk and also restricting a maximum movable range of said head, said method comprising:

- a first step of moving the head actuator until it strikes the stoppers in the inner side and in the outer side to recognize a movable range of the head actuator;
- a second step of computing a pitch angle that differs according to the movable range recognized in said first step;
- a third step of providing controls over an operation for writing servo data in said disk according to the pitch angle obtained in said second step;
- a fourth step of writing a data pattern in an arbitrary track of said disk by one round;
- a fifth step of writing noise patterns in adjoining tracks to the right and left sides from said arbitrary track;
- a sixth step for reading out the data pattern written in said fourth step from said arbitrary track;
- a seventh step of gradually moving said adjoining tracks, in which said noise patterns are to be written in, closer to a track with said data pattern having been written in each time when the data pattern read out in said sixth step is read, and repeating said fifth step and sixth step; and
- an eighth step of adding, when the data pattern read out in said sixth step can not be read, a specified value to a distance between a central position of said data pattern and a central position of said noise pattern at the point of time when the data pattern becomes unreadable to determine a prespecified track pitch according to the sum.

* * * * *